United States Patent [19]
Saba

[11] 3,911,904
[45] Oct. 14, 1975

[54] BLOOD PRESSURE MANOMETER
[75] Inventor: Joseph M. Saba, Waltham, Mass.
[73] Assignee: Technical Resources, Inc., Waltham, Mass.
[22] Filed: Jan. 21, 1974
[21] Appl. No.: 435,332

[52] U.S. Cl.............................. 128/2.05 G; 73/409
[51] Int. Cl.².......................................... A61B 5/02
[58] Field of Search..... 128/2.05 G, 2.05 C, 2.05 N, 128/2.05 P, 2.05 M, 2.05 D; 73/402, 409

[56] References Cited
UNITED STATES PATENTS

| | | | |
|---|---|---|---|
| 821,664 | 5/1906 | Morris | 128/2.08 |
| 1,539,030 | 5/1925 | Sweetland | 73/409 |
| 2,417,449 | 3/1947 | Rubin | 73/409 |
| 2,437,861 | 3/1948 | Rohr | 128/2.05 G |
| 2,618,977 | 11/1952 | Hottenroth | 73/409 |
| 3,254,671 | 6/1966 | Berliner | 128/2.05 G X |

Primary Examiner—Kyle L. Howell

[57] ABSTRACT

A blood pressure manometer comprising a pneumatic cuff to be wrapped around the limb of a person and, connected to the cuff, a pressure indication system comprising a housing, preferably with a longitudinal channel, visual pressure indication scale markings along the housing, and a resiliently expandable balloon-like air-containing member, preferably confined by the channel, attached at one end to the housing, the other end of the expandable member being free to expand along the length of the housing. The expansion of this member is directly related to the pressure delivered from the pneumatic cuff, the free end of the expandable member indicating blood pressure in accordance with the pressure indication markings on the pressure scale.

2 Claims, 3 Drawing Figures

U.S. Patent  Oct. 14, 1975  3,911,904
FIG 1
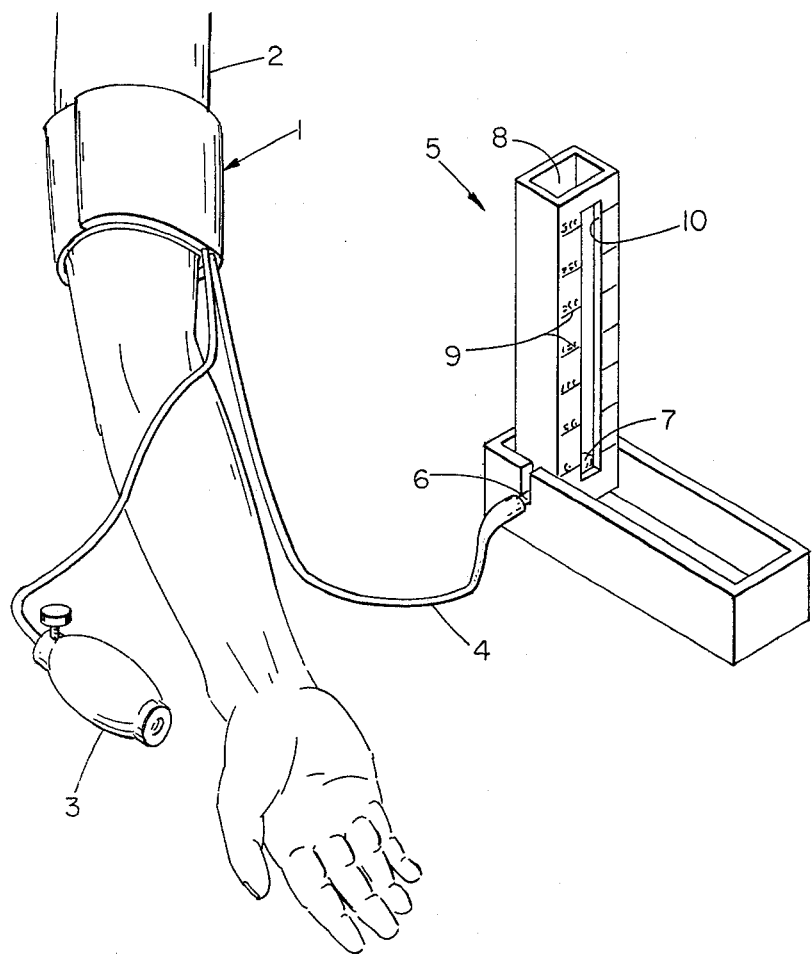
FIG 2
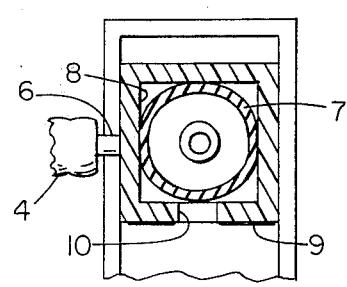
FIG 3

BLOOD PRESSURE MANOMETER

FIELD OF THE INVENTION

This invention relates to an improved device for measuring a person's blood pressure.

DESCRIPTION OF THE PRIOR ART

As is well known, one method used to accomplish blood pressure measurement is to apply constricting pressure around the limb of a person by an air-filled cuff, measuring the pressure within the cuff as the pressure is gradually relieved, while detecting certain sounds, e.g., by a stethoscope or electronic sensor. For this purpose a pneumatic hose conveys the pressure from the constricting cuff to a pressure measuring apparatus, typically either a column of mercury whose height changes along a scale to show the blood pressure, or a spring mechanism with e.g. a dial guage to indicate the blood pressure.

Such measuring apparatus is usually expensive or has other drawbacks. Mercury columns are heavy, lacking easy portability, and the mercury vapors given off by such a column can have a noxious effect. Spring devices, though more portable, use somewhat complex mechanisms and are somewhat expensive to produce.

OBJECTS OF THE INVENTION

It is an object of this invention to provide a manometer for measuring a person's blood pressure, which satisfies various of the above objects, is light weight, portable, simple, employing few parts and easy and inexpensive to construct.

FEATURES

In general the invention features a pneumatic cuff for constricting blood in the limb of a person, this cuff being connected to a pressure indicating system which comprises a housing having, visual pressure indication scale markings along its length which correspond to human blood pressure, and a resiliently expandable balloon-like air-containing member attached at one end to the housing, the other end of the expandable member being free to expand along the housing. The substance (e.g. of selected elastomer) or construction of the expandable member provides a predetermined expansion characteristic directly related to the pneumatic pressure of the cuff, and thus to the blood pressure of the person. The pressure is indicated by the extent of displacement of the free end of the expandable member along the pressure scale.

In a preferred embodiment the expandable member is an elastomer balloon confined against widthwise expansion by a longitudinal channel and providing a window for viewing the moving free end of the expandable member over the range of meaningful blood pressures.

Other advantages and features of the invention will be apparent from the description and drawings herein of a preferred embodiment thereof.

BRIEF DESCRIPTION OF THE DRAWINGS

FIG. 1 is a perspective view of the constricting cuff and the pressure indicating system of the preferred embodiment;

FIG. 2 is a frontal view of the pressure indicating system of FIG. 1; and,

FIG. 3 is a cross section taken on line 3—3 of FIG. 2.

DESCRIPTION OF PREFERRED EMBODIMENT

An annular inflatable cuff 1 is wrapped around the limb 2 of a person. The cuff has a conventional inflation bulb and valve 3 which causes the cuff to swell in size, constricting the flow of blood through the limb of the person and provides for gradual decrease of the inflating pressure. The pressure of the cuff is transmitted by a connecting pneumatic tube 4 to the pressure indication housing 5.

Within the housing the pressure is delivered through a metal connector 6 to a resiliently expandable air-containing member 7 confined in channel 8. This channel provides freedom only for longitudinal expansion. The expandable member 7 is a balloon formed of selected elastomeric material and shaped to expand lengthwise in direct relation to air pressure applied. This expandable member is sealed against the metal connector 6 in an airtight manner so that all pressure transferred by the pneumatic tube 4 causes the expandable member to inflate. Thus, as the pressure within the expandable member 7 is increased, the member expands along the channel. The channel is provided with an elongated window 10 through which the expanding balloon can be seen and the channel is open to atmosphere at the top and through window 10, as illustrated in FIGS. 1 and 3.

Adjacent to the window of the channel there are visual pressure indication scale markings 9. When the cuff pressure, transferred through the connecting pneumatic tube 4, causes the free end of the expandable member to rise within the channel, the height of the free end 7' of that member can be converted into blood pressure by comparing that height with the pressure scale marking 9' adjacent to it.

Other embodiments are within the scope of the invention and the following claims.

1. An aneroid syphgmomanometer comprising:
   a pneumatic constricting cuff for wrapping around the limb of a person;
   pressurizing means for pressurizing said cuff and controllably releasing said pressure; and
   pressure indicating means pneumatically attached to said cuff for measuring said pressure comprising:
      a housing defining an expansion channel therewithin open to atmosphere and having scale markings spaced along said channel; and
      an inflatable, resiliently expandable aircontaining member attached to said housing within said channel at one end thereof, said expandable member being arranged to expand and contract without external opposition or assistance within said housing along said channel in response to pneumatic pressure from said cuff, said housing preventing width-wise expansion of said member and having means for viewing and thereby determining the variable position of the free end of said member, said scale being calibrated to measure said pressure within said cuff, whereby blood pressure may be measured by comparing the position of said free end to said scale.

2. The syphygmomanometer of claim 1 wherein said expandable member comprises an elastomeric balloon and said means for viewing comprises a window extending along said channel.

* * * * *